No. 774,801. PATENTED NOV. 15, 1904.
M. VON ROHR.
LENS STEREOSCOPE.
APPLICATION FILED FEB. 23, 1904.
NO MODEL.

Witnesses:
Paul Krüger
Fritz Sander

Inventor
Moritz von Rohr.

No. 774,801.

Patented November 15, 1904.

UNITED STATES PATENT OFFICE.

MORITZ VON ROHR, OF JENA, GERMANY, ASSIGNOR TO THE FIRM OF CARL ZEISS, OF JENA, GERMANY.

LENS-STEREOSCOPE.

SPECIFICATION forming part of Letters Patent No. 774,801, dated November 15, 1904.

Application filed February 23, 1904. Serial No. 194,938. (No model.)

*To all whom it may concern:*

Be it known that I, MORITZ VON ROHR, doctor of philosophy, a citizen of the Kingdom of Prussia, residing at Jena, Carl Zeissstrasse, in the Grand Duchy of Saxe-Weimar, German Empire, have invented a new and useful Lens-Stereoscope, of which the following is a specification.

Lens-stereoscopes have already been so constructed as to allow of the right and the left lens system being moved closer together or farther apart for the purpose of adapting their relative distance to the interocular distance of the individual observer.

The present invention improves lens-stereoscopes of this kind in such a manner that the two stereoscopic views when separated from each other and so placed that their optical centers lie within the axes of their corresponding lens systems will not lose said correct position when the lens systems are adjusted for interocular distance. For this purpose a separate holder is provided for each individual view, and this holder is so connected with the corresponding (right or left) lens system as to retain its position in relation to the axis of this system during the process of moving both lens systems closer together or farther apart for adaptation to interocular distance. Thus when each view has been correctly placed in its holder—*i. e.*, so that its optical center lies within the axis of the corresponding lens system—its position is still correct after the lens systems have been moved either closer together or farther apart.

Figure 2:
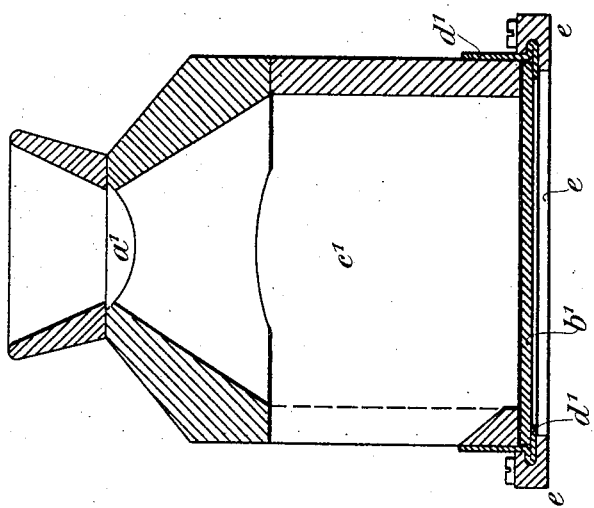
Figure 1:
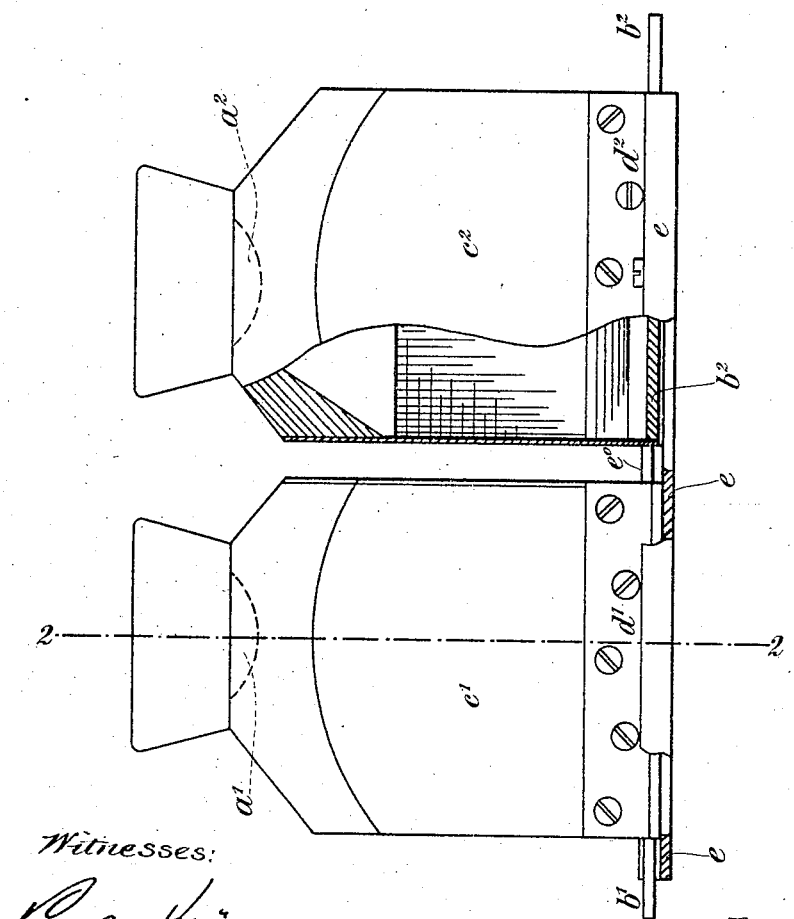

In the accompanying drawings, Figure 1 is a front view, partly in section, of a lens-stereoscope constructed according to the invention. Fig. 2 is a section on line 2 2 in Fig. 1.

In the example shown the lens systems consist of simple magnifiers $a'$ $a^2$, their distance from the views $b'$ $b^2$ being, moreover, invariable. Under these circumstances each of the lenses $a'$ $a^2$ is immediately mounted in its respective carrier $c'$ $c^2$. Each lens-carrier is rigidly connected with a corresponding view-holder $d'$ $d^2$, so that lens-carrier and view-holder form an integral whole—the half of a stereoscope. Each view-holder $d'$ and $d^2$ consists of two angular plates screwed onto the lens-carriers $c'$ and $c^2$, respectively. One of the halves of the stereoscope is secured, by means of its view-holder $d^2$, to a frame $e$, into which the other half of the stereoscope slides easily by means of the outer flanges of the view-holder $d'$. A scale of the distances between the lenses may easily be provided for at, for instance, $e^0$ on the upper surface of the frame $e$, the lateral edge of the view-holder $d'$ serving as an index. In order to move lenses and views simultaneously either closer together or farther apart, the left hand seizes the lens-carrier $c'$ of the left half, the right that $c^2$ of the right half, of the stereoscope.

In place of the arrangement shown for an immediate relative displacement of the halves of the stereoscope indirect means could also be devised for variation of distance between the halves of the stereoscope.

What I claim as my invention, and desire to secure by Letters Patent, is—

1. A stereoscope comprising two lens systems, two holders for single photographic views, a sliding connection between the lens systems, a sliding connection between the holders and means for simultaneously adjusting both connections.

2. A stereoscope consisting of two distinct halves slidingly connected to each other, each comprising a lens system and a holder for single photographic views rigidly connected to the lens system.

In testimony whereof I have signed my name to this specification in the presence of two subscribing witnesses.

MORITZ VON ROHR.

Witnesses:
 PAUL KRÜGER,
 FRITZ SANDER.